Feb. 9, 1965   L. C. CLOUSER, JR   3,168,862
SWING-OUT MOTOR MOUNTING FOR OUTDOOR GRILLS
Filed April 5, 1962   2 Sheets-Sheet 1
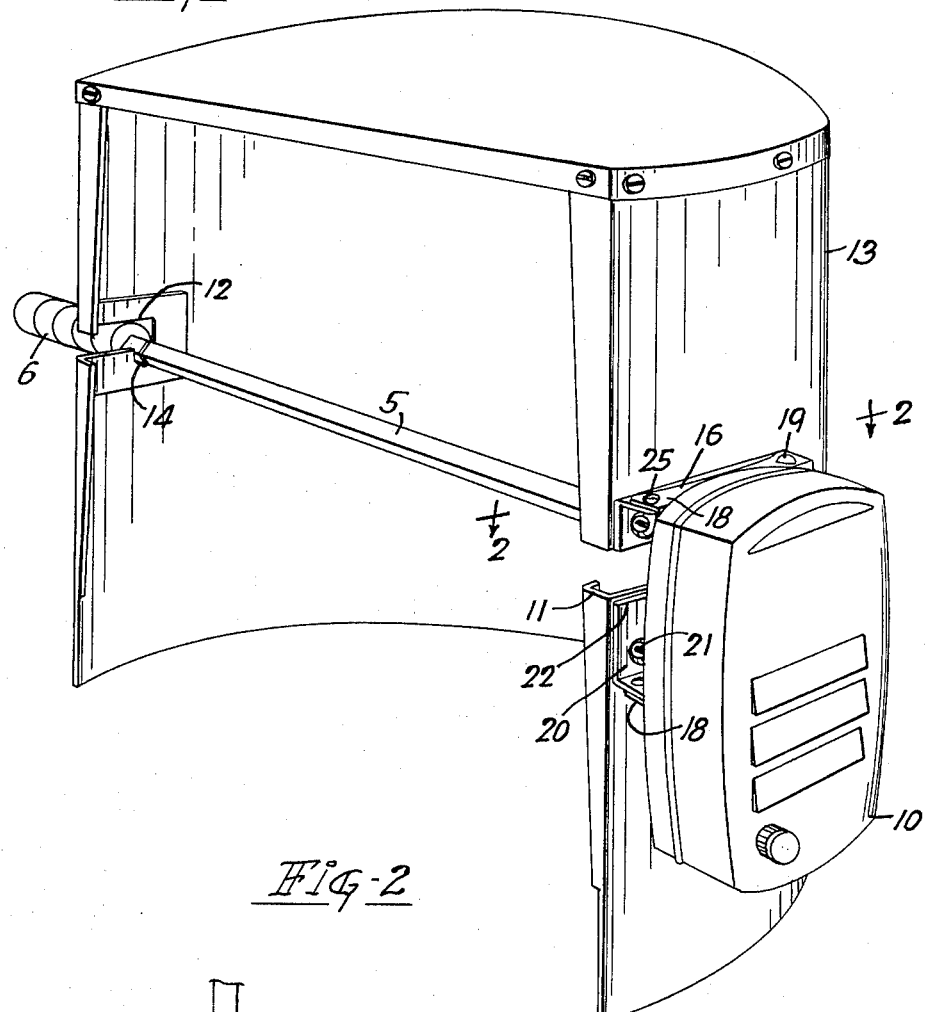
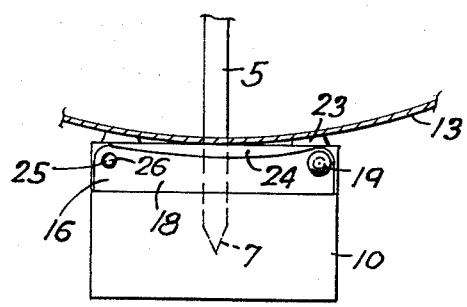
INVENTOR.
LEON C. CLOUSER JR.
BY
ATTORNEY

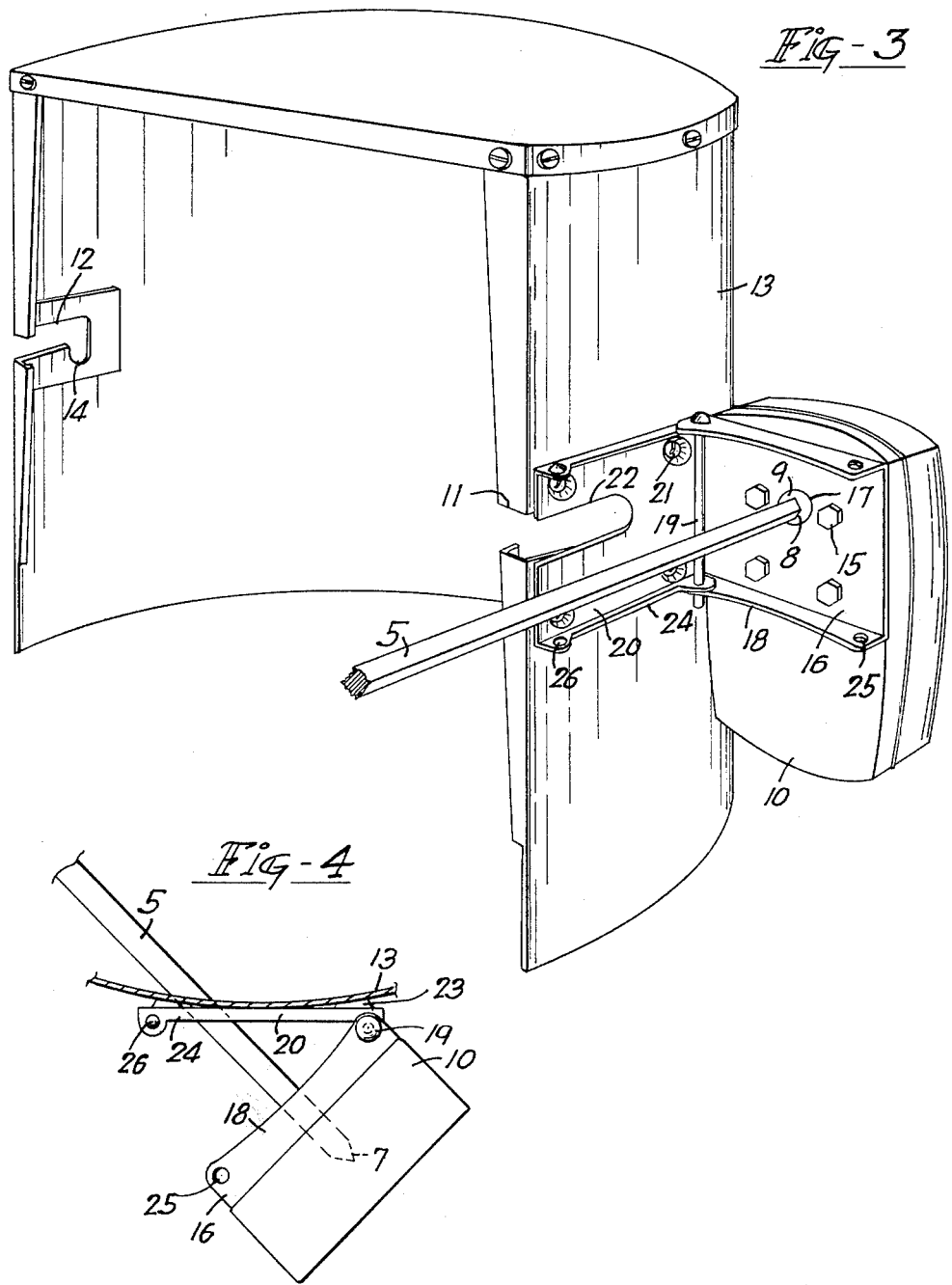

United States Patent Office 3,168,862
Patented Feb. 9, 1965

3,168,862
SWING-OUT MOTOR MOUNTING FOR
OUTDOOR GRILLS
Leon C. Clouser, Jr., Freeport, Ill., assignor to Structo
Manufacturing Company, Freeport, Ill., a corporation
of Illinois
Filed Apr. 5, 1962, Ser. No. 185,455
4 Claims. (Cl. 99—421)

This invention relates to a swing-out motor mounting for outdoor grills.

In accordance with my invention the drive motor is carried on a plate hinged to a slotted attaching plate secured to one side of the hood for an outdoor grill, where the hood is slotted on both sides in register with the slot in the attaching plate, the slot on that side remote from the attaching plate being a bayonet slot for releasably locking the spit rod in place besides providing bearing support for the handle end of the rod, the spit rod being equipped with a handle on one end and suitably sharpened at the other end to pierce the meat and also make a fairly rigid driving connection with the driven mandrel of the motor so that the motor can be swung by means of the spit rod from the handle end thereof and the spit rod can be loaded before being connected with the mandrel and then swung with the motor into operative position in the slots in the hood, the bayonet slot on the handle side of the hood preventing lateral displacement at that end of the spit rod, and a suitable detent means being also provided to hold the hinged motor supporting plate releasably in locked relationship to the attaching plate at the other end of the spit rod.

The invention is illustrated in the accompanying drawing, in which:

FIG. 1 is a perspective view of the assembly provided in accordance with my invention showing the spit rod and drive motor in their operative position;

FIG. 2 is a top view of the motor mounting taken on line 2—2 of FIG. 1; and

FIGS. 3 and 4 are views similar to FIGS. 1 and 2, FIG. 3 showing the motor and spit rod swung out fully, and FIG. 4 showing these parts in an intermediate position.

The same reference numerals are applied to corresponding parts in the four views.

The split rod 5, which is of square cross-section and has a handle 6 fixed on one end, has the other end 7 suitably pointed to impale the meat and yet permit making detachable connection in the square hole 8 in the drive mandrel 9 of a motor 10, and is adapted to extend through slots 11 and 12 in the opposite side walls of a sheet metal hood 13 for an outdoor grill brazier for the broiling of meat over a charcoal fire, the meat being turned slowly as the spit rod 5 is driven by the motor 10. The slot 12 is of a bayonet form, as indicated at 14, to retain the spit rod releasably at the handle end, there being suitable detent means in connection with the motor mounting, as will soon appear, to hold the motor releasably in its operative position and accordingly retain that end of the spit rod in slot 11 during the broiling operation.

The motor 10 is fastened by screws 15 to a mounting plate 16 having a hole 17 provided therein in which the hub or mandrel 9 previously mentioned turns in the operation of the motor 10. There are parallel horizontal flanges 18 on the upper and lower edges of the plate 16 having registering holes provided therein through which a headed pintle 19 extends for the hinging of the mounting plate 16 on a slotted attaching plate 20 fastened by means of screws 21 to one side wall of the hood 13 with its slot 22 in register with slot 11. There are hollow embossed portions 23 provided on the attaching plate 20 through which the screws 21 are extended, whereby to compensate for the curvature of the side wall of the hood as clearly appears in FIGS. 2 and 4 and also space the attaching plate 20 with respect to the wall except at the four points of connection and accordingly reduce heat transfer from the hood wall to the motor mounting and motor to a minimum. There are parallel horizontal flanges 24 on the top and bottom edges of the attaching plate 20 and these have holes registering with the holes in the flanges 18 to receive the pintle 19 to provide the hinge connection. Circular detent holes 25 are provided in the flanges 18 at the far end from pintle 19 and these holes register with rounded detent projections 26 provided on the flanges 24 to hold the motor 10 releasably in the operative position shown in FIGS. 1 and 2.

In operation, this swing-out motor mounting greatly facilitates the application of meat onto the spit rod 5 and the removal therefrom. When there are hot coals in the brazier, it is sometimes difficult, if not actually impossible, for the operator to reach inside the hood 13 to lift the spit rod out and disconnect it from the motor, whereas with the present construction, the entire assembly of motor, motor mounting and spit rod are swingable outwardly, the operator using the handle 6 to lift the outer end of the spit rod 5 clear of the inner end 14 of slot 12 and swing the entire assembly of rod 5, mounting plate 16 and motor 10 by means of the rod 5 and its handle 6 to the position of FIG. 3, the rod 5 being rigid with the motor 10 at its pointed end 7 so that the motor is swingable easily from the handle end 6 of the rod, and the weight of the meat being meanwhile nicely supported to a large extent by the mounting plate 16 and motor 10 so that there is no danger of dropping the freshly grilled meat either into the fire or onto the ground, as is otherwise apt to happen, especially if the operator happens to burn his hand in the process of removing the spit rod, using the old unimproved constructions. With the entire assembly out of the heat zone, as appears in FIG. 3, there is no danger of burning the hands or having the meat dropped. The motor 10 by virtue of its spaced relationship to the side of the hood 13 in its operative position is protected against overheating, and the hinge mounting designed to afford this spacing also provides for the swing-out mounting of the spit rod to enable doing the greater part of what has to be done with the spit rod outside the heat zone so that the operator can attend to this work in a leisurely manner and, being unhurried, is not so apt to have an accident. The locking action afforded by the bayonet slot 14 eliminates any likelihood of that end of the spit rod becoming displaced from its bearing support on the hood 13, and the detents at 25–26 serve to further maintain the motor in the right parallel spaced relationship to the hood during the broiling operation and still the locking action at this point is not enough to interfere with the easy swinging of the motor to open position by means of the handle end of the spit rod at the end of the broiling operation.

It is believed the foregoing description conveys a good understanding of the objects and advantages of my invention. The appended claims have been drawn to cover all legitimate modifications and adaptations.

I claim:
1. In combination, an upright open front heat enclosing hood for a grill brazier having upright side walls in which substantially horizontal slots are provided opening toward the front thereof, one of these slots being a bayonet slot with downwardly extending inner end adapted to retain a spit rod against displacement while turning in said inner end portion, a spit rod disposed substantially horizontally in said slots for support of meat to be grilled and having a handle on that portion received in the bayonet slot for manipulation of the rod from outside the hood, the other end of said spit rod being pointed for penetration of meat or fowl and also having a portion next to the point shaped for drive purposes, a motor for driving said spit rod having a spit driving mandrel detachably drivingly connectable with and supporting the last mentioned end of said rod, said connection making the motor rigid with the rod to be swingable by means of said rod from the handle end thereof, and a hinge hingedly supporting the motor on one side wall of the hood so as to be swingable from a spit rod operating position in closely spaced parallel relation to said side wall to a spit rod loading and unloading position swung away from said side wall, said hinge comprising two vertical plates pivotally connected at adjoining vertical edges on a vertical axis in a vertical plane in rearwardly spaced relation to the motor mandrel and the inner ends of the slots in the side walls of said hood, one of said plates being rigidly secured to the side wall of the hood remote from the bayonet slot, and the other of said plates rigidly supporting the motor thereon, whereby when the spit rod is swung forwardly in a horizontal plane out of said slots the motor is swung by means of said rod and its handle away from the last named side wall of the hood to space the mandrel and rod outwardly relative thereto for easy removal and replacement of the pointed end of the rod relative to the mandrel spaced amply from the source of heat enclosed by said hood.

2. The combination as set forth in claim 1 wherein the hinge plate secured to the side wall of the hood is of sheet metal construction and has outwardly embossed portions for engagement with and fastening to the side wall of said hood to space said parts and reduce heat transfer from said hood to said plate and thence through the other of said hinge plates to said motor.

3. The combination as set forth in claim 1 wherein the one hinge plate that is secured to the side wall of the hood has outwardly extending parallel horizontal flanges on its upper and lower ends, and the other of said hinge plates on which the motor is mounted is disposed in spaced parallel relationship to said first mentioned plate and has inwardly extending parallel horizontal flanges on its upper and lower ends disposed in pivotal relationship with said first named flanges, the pivotal connection between said plates being on one end of said flanges.

4. The combination as set forth in claim 3, including detent means at the other end of said flanges remote from the pivoted end releasably locking said hinge plates in closed position.

References Cited by the Examiner
UNITED STATES PATENTS

| 1,067,119 | 7/13 | Iblings | 16—140 |
| 1,609,518 | 12/26 | Larson | 16—140 |
| 2,201,594 | 5/40 | Sitts | 16—137 |
| 2,485,890 | 10/49 | Keéjik | 99—421 |
| 2,791,959 | 5/57 | Pirz | 99—421 |
| 2,797,633 | 7/57 | Goodwin | 99—421 |
| 2,815,707 | 12/57 | Morrow | 99—421 |
| 2,885,950 | 5/59 | Stoll et al. | 99—421 X |
| 2,887,944 | 5/59 | Walker | 99—421 |
| 2,961,942 | 11/60 | Terry | 99—421 X |

OTHER REFERENCES

Structo advertisement, January 1962, Home Furnishings Daily.

L. WILLIAM VARNER, *Primary Examiner.*

JEROME SCHNALL, ROBERT E. PULFREY,
*Examiners.*